July 20, 1926.
M. LOPES
SHAFT SUPPORT
Filed June 3, 1925
1,593,307
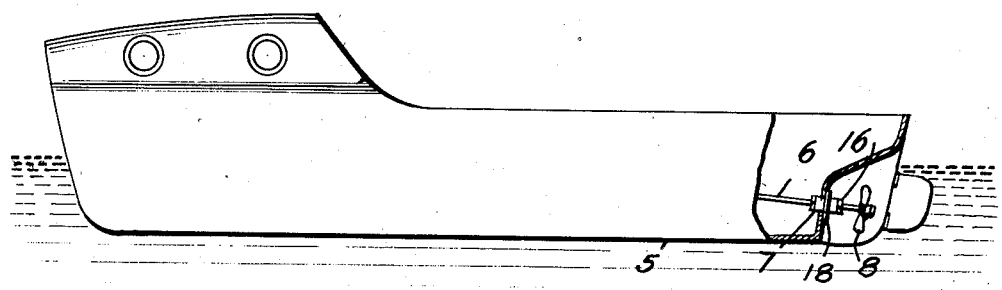
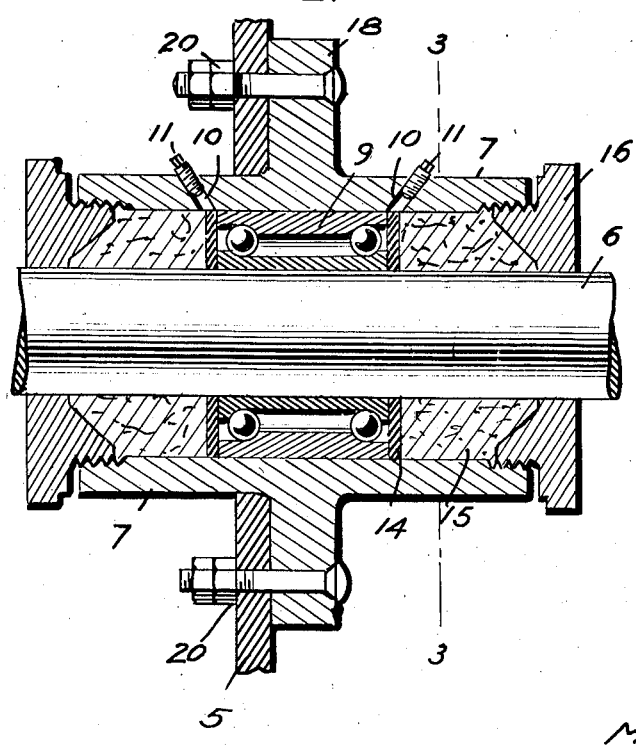
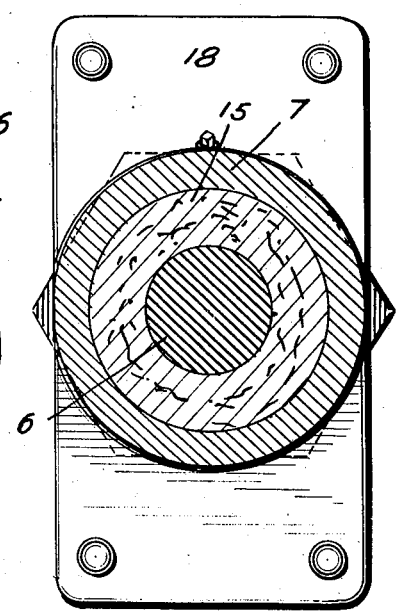
Inventor
MANUEL LOPES
Stevens and Batchelor
Attorney Patented July 20, 1926.

1,593,307

UNITED STATES PATENT OFFICE.

MANUEL LOPES, OF NORTH DARTMOUTH, MASSACHUSETTS.

SHAFT SUPPORT.

Application filed June 3, 1925. Serial No. 34,720.

This invention relates to shaft supports especially adapted for use in connection with the propeller shafts of motor boats although not necessarily restricted to such use.

Briefly stated, an important object of this invention is to provide a shaft support of the character specified having a housing provided with simple means whereby an anti-friction element such as a series of ball bearings or roller bearings may be inserted from either end, depending on which end is more convenient, all without the exercise of unusual skill or effort.

A further object of this invention is to provide a shaft support of the character specified having simple means to prevent the passage of water or the leakage of the lubricant contained within the support.

Other objects and advantages will be apparent during the course of the following description.

In the accompanying drawing forming a part of this application and in which like numerals are employed to designate like parts throughout the same, Figure 1 is a side elevation of the improved support applied to a motor boat;

Fig. 2 is a vertical sectional view through the support;

Fig. 3 is a vertical transverse sectional view taken on line 3—3 of Fig. 2.

In the drawing, wherein for the purpose of illustration is shown a preferred embodiment of the invention, the numeral 5 designates a hull within which a motor of any type is mounted. The motor is provided with a propeller shaft 6 which extends through the housing 7 and which is provided at its rear end with a propeller 8.

The invention forming the subject matter of this application consists in the particular means for supporting the shaft 6 and by reference to Fig. 2 it will be seen that the shaft 6 is extended centrally through the sleeve-shaped housing 7 and through a double ball bearing 9. The ball bearing 9 has two series of balls confined within the usual inner and outer raceways and these balls may be lubricated by grease supplied through openings 10 in the sleeve 7. Suitable plugs 11 may be employed to close the openings 10 and thereby prevent the leakage of grease or the passage of water. Particular attention is directed to the fact that the sleeve 7 is of the same internal diameter throughout so that the ball bearing 9 may be inserted from either end of the sleeve.

Fig. 2 also illustrates that bronze or other spacing washers 14 are located at opposite ends of the ball bearing 9 and form stops for the inner ends of packing units 15. The packing units 15 are confined between the washers 14 and packing nuts 16 threaded into opposite ends of the sleeve 7.

In the use of the invention the sleeve 7 may be provided with a semi-fluid waterproof grease or lubricant which will co-operate with the packing 15 in preventing the passage of water.

Particular attention is directed to the fact that the sleeve 7 is provided with an external annular attaching flange 18 which may be secured to the hull by bolts or other fastening devices 20.

When the improved support is applied the anti-friction element 9 may be conveniently removed or inserted from either end of the sleeve 7 and thereby provide a structure which is adapted for use in a variety of ways and which may be manufactured with a minimum of machine work.

With reference to Fig. 2 it will be observed that the attaching flange 18 may be secured either to the inner or outer side of the hull and thus it might be said that the housing is interchangeably attached to the hull. In other words, the flange may be located at either the inner or outer side of the hull. The external diameter of the housing 7 is the same at both sides of the flange 18.

The flange 18 flatly engages the wall and seals the opening in which sleeve 7 is located. Also it is noted that oil ducts and openings 10 are so spaced from the flange 18 that whichever one is located within the boat will clear the wall and be accessible.

Having thus described the invention, what is claimed is:

1. A power shaft support for boats or the like comprising a sleeve of uniform internal and external diameter from end to end, an anti-friction element insertible into the sleeve from either end thereof, means whereby to attach the sleeve in a wall opening and including a medial circumferential flange carried by said sleeve and adapted to be clamped flatly against a wall and effect a seal between the same and the opening therein, spacing washers at opposite ends of the anti-friction element, packing members within said sleeve and outwardly of said washers, and interchangeable packing nuts threaded into opposite ends of said sleeve and engaging said packing members, said sleeve being provided with threaded openings adjacent said anti-friction element on either side of said flange and spaced therefrom a distance so as to be accessible from either side of the wall no matter which end of the sleeve is extended through the wall into the ship, and forming a means whereby the anti-friction element may be provided with a lubricant.

2. A power shaft support for boats or the like comprising a sleeve of uniform internal and external diameter from end to end, an anti-friction element insertible into said sleeve from either end thereof, duplicate elements at each end of said sleeve and engaging said anti-friction element to adjustably position the same and hold it in place, a medial circumferential flange upon said sleeve and adapted to flatly engage either side of the stern wall of the boat to effectively seal the opening therein in which said sleeve is mounted and through which the power shaft extends, clamping means carried by said flange and stern wall, and said sleeve being provided with lubrication openings on either side of said flange and spaced therefrom a distance greater than the thickness of the stern wall whereby one of said openings will be accessible from within the boat no matter which end of the sleeve is extended thereinto and no matter on which side of the stern wall the flange is engaged.

In testimony whereof I affix my signature.

MANUEL LOPES.